United States Patent
Campbell et al.

(10) Patent No.: US 9,182,980 B2
(45) Date of Patent: Nov. 10, 2015

(54) EXPANSION AND REDUCTION OF SOURCE CODE FOR CODE REFACTORING

(71) Applicant: Microsoft Corporation, Redmond, WA (US)

(72) Inventors: Dustin R. Campbell, Redmond, WA (US); Kevin Pilch-Bisson, Snohomish, WA (US); Cyrus Najmabadi, Seattle, WA (US); David J. Poeschl, Issaquah, WA (US); Vladimir Reshetnikov, Redmond, WA (US)

(73) Assignee: MICROSOFT TECHNOLOGY LICENSING, LLC., Redmond, WA (US)

(*) Notice: Subject to any disclaimer, the term of this patent is extended or adjusted under 35 U.S.C. 154(b) by 52 days.

(21) Appl. No.: 13/710,612

(22) Filed: Dec. 11, 2012

(65) Prior Publication Data

US 2014/0165035 A1    Jun. 12, 2014

(51) Int. Cl.
*G06F 9/44* (2006.01)

(52) U.S. Cl.
CPC ........................................ *G06F 8/72* (2013.01)

(58) Field of Classification Search
None
See application file for complete search history.

(56) References Cited

U.S. PATENT DOCUMENTS

| | | | |
|---|---|---|---|
| 6,804,682 B1* | 10/2004 | Kemper et al. | 1/1 |
| 8,667,456 B1* | 3/2014 | Czymontek | 717/100 |
| 2006/0123394 A1* | 6/2006 | Nickell et al. | 717/124 |
| 2008/0052684 A1 | 2/2008 | Bowdidge et al. | |
| 2009/0265692 A1 | 10/2009 | Godefroid et al. | |
| 2009/0271766 A1* | 10/2009 | Luo et al. | 717/124 |
| 2010/0077380 A1* | 3/2010 | Baker et al. | 717/120 |
| 2010/0153940 A1 | 6/2010 | Remmel et al. | |

OTHER PUBLICATIONS

"RefactoringNG: a Flexible Java Refactoring Tool", Troníčaek, SAC'12, Mar. 25-29, 2012, Riva del Garda, Italy.*
"Keep track of" Synonyms from Thesaurus.com, Dec. 15, 2011.*
Moghadam, et al., "Automated Refactoring using Design Differencing", Retrieved at <<http://ieeexplore.ieee.org/stamp/stamp.jsp?tp=&arnumber=6178875>>, Proceedings of the in 16th European Conference on Software Maintenance and Reengineering, Mar. 27, 2012, pp. 10.
Ng, et al., "Exposing the C# and VB compiler?s code analysis", Retrieved at <<http://msdn.microsoft.com/en-us/vstudio/hh500769.aspx>>, Sep. 2012, pp. 15.
Swamy, et al., "A Theory of Typed Coercions and its Applications", Retrieved at <<http://research.microsoft.com/en-us/um/people/nswamy/papers/coercions.pdf>>, Proceedings of the 14th ACM SIGPLAN international conference on Functional programming, Aug. 31, 2009, pp. 12.

(Continued)

*Primary Examiner* — Don Wong
*Assistant Examiner* — Daxin Wu
(74) *Attorney, Agent, or Firm* — Ben Tabor; Kate Drakos; Micky Minhas

(57) ABSTRACT

An automated programming tool can receive program source code and can expand portions of the program source code to make to make identifiers explicit, insert sets of parenthesis and so on. Expansions can be kept track of so that reductions after refactoring can be confined to altered portions of the program source code.

20 Claims, 8 Drawing Sheets

(56) References Cited

OTHER PUBLICATIONS

"Changelog for Type Annotations (JSR 308) specification", Retrieved at <<http://types.cs.washington.edu/jsr308/specification/jsr308-changes.html>>, Jul. 3, 2012, pp. 9.

Spin Ellis, Diomidis, "The CScout Refactoring Browser", Retrieved at <<http://www.spinellis.gr/cscout/doc/indexw.html>>, Dec. 10, 2003, pp. 74.

* cited by examiner

```
using System;                              151 class C                                    152

{ static void Main()                      154

{

Action<string> f = Foo<string>;      156

Action<string> g = null;             157 var h = f + g;                       158

} static void Foo<T>(T y) { }             160
}
                                           150
```

FIG. 1b

```
using System;
class C
{
   static void Main()
   {
      Action<string> g = null;
      var h = (Foo<string>) + g            163
   }          163a static void Foo<T>(T y) { }
}
                                           162
```

FIG. 1c

```
using System;
class C
{
    static void Main()
    {                                                                              ─165
        Action<string> f = ((global::System.Action<global::System.String>))(Foo<string>));
        Action<string> g = null;
        var h = ((global::System.Action<global::System.String>) (f)) + g;        166
    } static void Foo<T>(T y) { }
}
```
164

FIG. 1d

```
using System;
class C
{
    static void Main()
    {
        Action<string> g = null;
        var h = ((global::System.Action<global::System.String>)
            (((global::System.Action<global::System.String>)(Foo<string>)))) + g;    168
    } static void Foo<T>(T y) { }
}
```
167

FIG. 1e

```
using System;
class C
{
  static void Main()
  {
    Action<string> g = null;
    var h = ((global::System.Action<global::System.String>)
       (((global::System.Action<global::System.String>)(Foo<string>))) + g;
  } static void Foo<T>(T y) { }                                              170
}                                                                          169
```

FIG. 1f

```
using System;
class C
{
  static void Main()
  {
    Action<string> g = null;
    var h = ((global::System.Action<global::System.String>)((Foo<string>))) + g;   172
  }
  static void Foo<T>(T y) { }
}                                                                                 171
```

FIG. 1g

```
Using System;
Class C
{
  static void Main()
  {
      Action<string> g = null;
    var h = ((global::System.Action<global::System.String>)
       Foo<string>) + g;
  }
  static void Foo<T>(T y) { }                                         174      173
}
```

FIG. 1h

```
using System;
class C
{
  static void Main()
  {
    Action<string> g = null;
    var h = (Foo<string>) + g;                    176
  } static void Foo<T>(T y) { }
}                                                  175
```

FIG. 1i

EXPANSION AND REDUCTION OF SOURCE CODE FOR CODE REFACTORING

BACKGROUND

Manually transforming source code without changing the semantics is a challenging task. Building an automated tool that transforms source code correctly is even more difficult. One of the reasons that programmatically transforming code correctly is so difficult is because it is so context-dependent. Suppose for example, a variable name is to be changed from "x" to "y". Simply doing a "replace all 'x's with 'y's" is just not going to work. In addition to changing any variable with an 'x' in the name, 'x's in different code modules may be completely unrelated variables.

One common reason to transform source code is to refactor it. Refactoring has been defined by Martin Fowler as a "disciplined technique for restructuring an existing body of code, altering its internal structure without changing its external behavior". (See Martin Fowler in http://refactoring.com). Refactoring is typically undertaken in order to improve non-functional, dysfunctional or sub-optimal characteristics of the software being altered. Refactoring can result in improved code readability and reduced complexity, allowing refactored source code to be maintained more easily.

Refactoring is often accomplished by applying a series of small changes in source code and checking to make sure that the change either preserves desired behavior of the software or retains its functionality.

SUMMARY

An automated programming tool, in response to identification of one or more refactoring operations to be performed and a universe of program source code to be refactored, can programmatically, without further human intervention, expand program source code. Program source code may be expanded so that automated refactoring is correctly applied. The automated programming tool can expand program source code by inserting typecasts, resolving identifiers to fully-qualified names, inserting sets of parentheses to enable an expression to be correctly parsed, inserting escape identifiers so that the identifiers are not treated as keywords, using static method invocation syntax for extension methods, replacing inferred types with explicit types to ensure unchanged inference results and so on. The automated programming tool can keep track of what expansions were made to the original program source code. The automated programming tool can send or provide the expanded source code to an automated programming tool that performs refactoring operations or to a user to perform manual refactoring.

An automated programming tool can receive the expanded program source code and can programmatically, without further human intervention, perform the indicated refactoring operation on the indicated universe of program source code. Refactoring operations can include but are not limited to: add parameter, change bidirectional association to unidirectional, change reference to value, change unidirectional association to bidirectional, change value to reference, collapse hierarchy, consolidate conditional expression, consolidate duplicate conditional fragments, convert dynamic to static construction, convert static to dynamic construction, decompose conditional, duplicate observed data, eliminate inter-entity bean communication, encapsulate collection, encapsulate downcast, encapsulate field, extract class, extract interface, extract method, extract package, extract subclass, extract superclass, form template method, hide delegate, hide method, hide presentation tier-specific details from the business tier, inline class, inline method, inline temp, introduce a controller, introduce assertion, introduce business delegate, introduce explaining variable, introduce foreign method, introduce local extension, introduce null object, introduce parameter object, introduce synchronizer token, localize disparate logic, merge session beans, move business logic to session, move class, move field, move method; parameterize method, preserve whole object, pull up constructor body, pull up field, pull up method, push down field, push down method, reduce scope of variable, refactor architecture by tiers, remove assignments to parameters, remove control flag, remove double negative, remove middle man, remove parameter, remove setting method, rename method, replace array with object, replace assignment with initialization, replace conditional with polymorphism, replace conditional with visitor, replace constructor with factory method, replace data value with object, replace delegation with inheritance, replace error code with exception, replace exception with test, replace inheritance with delegation, replace iteration with recursion, replace magic number with symbolic constant, replace method with method object, replace nested conditional with guard clauses, replace parameter with explicit methods, replace parameter with method, replace record with data class, replace recursion with iteration, replace static variable with parameter, replace subclass with fields, replace temp with query, replace type code with class, replace type code with state/strategy, replace type code with subclasses, reverse conditional, self-encapsulate field, separate data access code, separate query from modifier, split loop, split temporary variable, substitute algorithm, use a connection pool, wrap entities with session. (List from Martin Fowler in http://refactoring.com). The automated programming tool can send or provide the refactored program source code to an automated programming tool that reduces the refactored program source code by removing unnecessary program source code that was inserted as part of the expansion process.

An automated programming tool can receive the refactored program source code. The automated programming tool can programmatically, without human intervention, remove unnecessary typecasts, name qualifications and/or sets of parentheses, remove unnecessarily explicit types with inferred types, if program meaning would be unchanged, eliminate unnecessary identifier escaping, and can simplify static method invocations of extension methods to instance syntax, etc. inserted by the automated expansion programming tool while leaving unchanged those portions of the program source code that were not affected by the refactoring operations.

Views of the expanded program source code may or may not be provided to a user. Views of the expanded and refactored program source code may or may not be provided to a user. Views of the expanded, refactored and reduced program source code are provided to a user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

In the drawings:

FIG. 1b illustrates an example of program source code 150 to be refactored in accordance with aspects of the subject matter disclosed herein;

FIG. 1c illustrates an example of expected refactored program source code 162 in accordance with aspects of the subject matter disclosed herein;

FIG. 1d illustrates an example of expanded program source code 164 in accordance with aspects of the subject matter disclosed herein;

FIG. 1e illustrates an example of the refactored expanded program source code 167 in accordance with aspects of the subject matter disclosed herein;

FIG. 1f illustrates an example of the reduced refactored program source code 169 in accordance with aspects of the subject matter disclosed herein;

FIG. 1g illustrates an example of further reduced refactored program source code 171 in accordance with aspects of the subject matter disclosed herein;

FIG. 1h illustrates an example of further reduced refactored program source code 173 in accordance with aspects of the subject matter disclosed herein;

FIG. 1i illustrates an example of further reduced refactored program source code 175 in accordance with aspects of the subject matter disclosed herein;

DETAILED DESCRIPTION

Overview

Refactoring source code in a way that preserves desired program behavior is challenging. Even the simplest refactoring operation can easily change the meaning of program source code by failing to insert necessary typecasts, by failing to fully qualify identifiers such as but not limited to type names or members, by failing to enclose expressions or parts of expressions within sets of parentheses and so on. Traditionally, developers and automated code refactoring tools approach the task of refactoring on a case-by-case basis by trying to detect when a typecast should be made, when an identifier should be qualified, or when an expression or a portion of an expression should be enclosed within a set of parentheses. This approach is error-prone and usually results in over-complicated and fragile implementations that are difficult to maintain.

The subject matter disclosed herein describes an automated programming tool that may expand program source code before the program source code is refactored. An automated programming tool may reduce the expanded portions of the program source code after the program source code is refactored. An automated programming tool may receive expanded program source code and refactor the expanded program source code. An automated programming tool may send the refactored expanded program source code to the automated programming tool that reduces the expanded portions of the program source code after the program source code is refactored. According to aspects of the subject matter described herein, the program source code can be expanded by making references explicit, inserting typecasts and inserting sets of parentheses around expressions or elements of an expression so a parser can correctly parse the expression. The automated programming tool can transform the program source code by refactoring the expanded program source code. After refactoring, the program source code can be reduced. In accordance with some aspects of the subject matter described herein, only the expansions made to the program source code are reduced so that, for example, developer coding preferences in the original program source code are retained.

Expansion and Reduction of Source Code for Code Refactoring

Figure 1A:
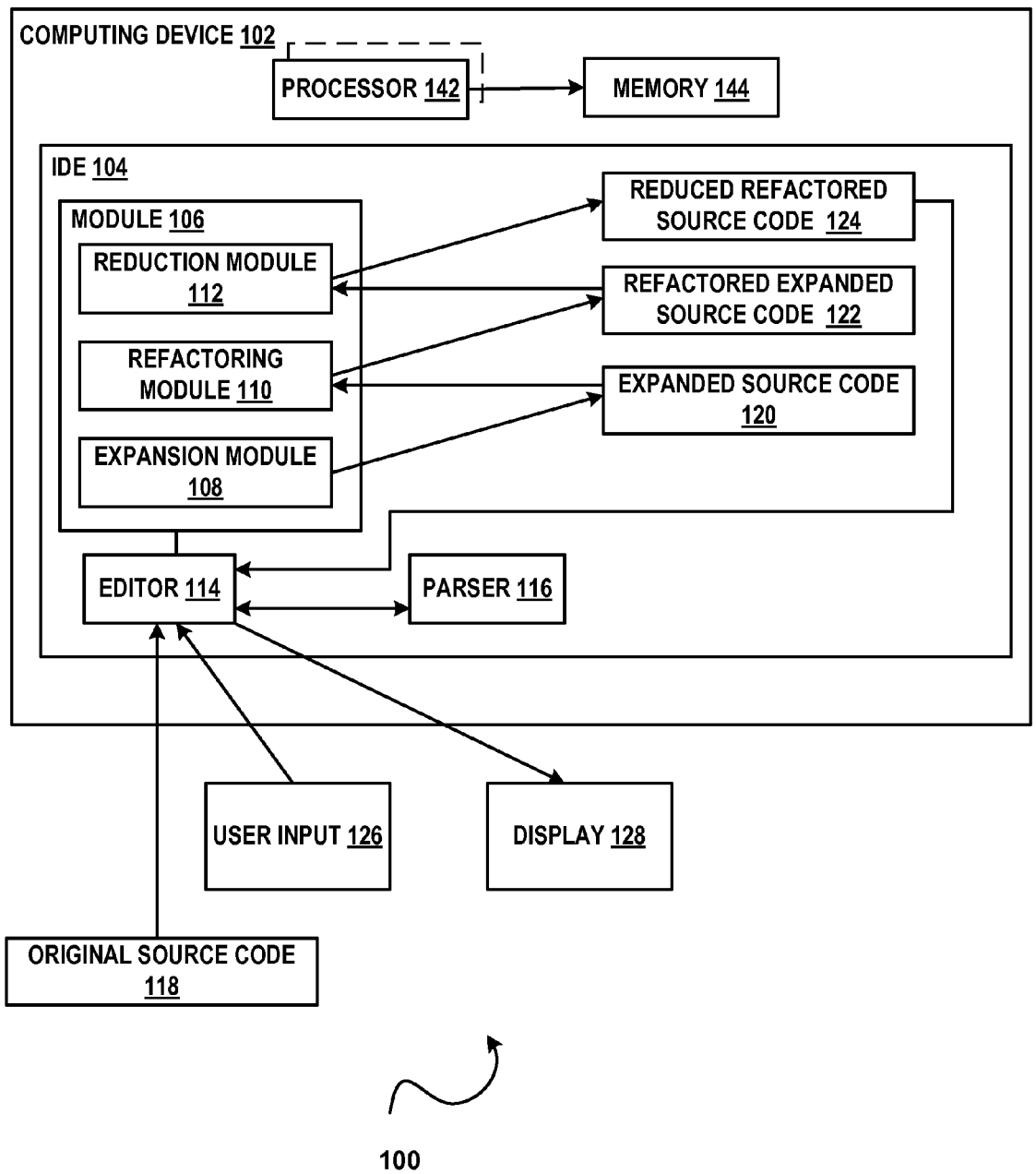
FIG. 1a illustrates an example of a system 100 that automatically refactors program source code in accordance with aspects of the subject matter described herein.

FIG. 1a illustrates a block diagram of an example of a system 100 in accordance with aspects of the subject matter described herein. All or portions of system 100 may reside on one or more computers or computing devices such as the computers described below with respect to FIG. 3. System 100 or portions thereof may be provided as a stand-alone system or as a plug-in or add-in. System 100 or portions thereof may include information obtained from a service (e.g., in the cloud) or may operate in a cloud computing environment. A cloud computing environment can be an environment in which computing services are not owned but are provided on demand. For example, information may reside on multiple devices in a networked cloud and/or data can be stored on multiple devices within the cloud. System 100 may execute in whole or in part on a software development computer such as the software development computer described with respect to FIG. 4. All or portions of system 100 may be operated upon by program development tools. For example, all or portions of system 100 may execute within an integrated development environment (IDE) such as for example IDE 104. IDE 104 may be an IDE as described more fully with respect to FIG. 4 or can be another IDE. System 100 can execute wholly or partially outside an IDE.

System 100 can include one or more computing devices such as, for example, computing device 102. A computing device such as computing device 102 can include one or more processors such as processor 142, etc., and a memory such as memory 144 connected to the one or more processors. Computing device 102 can include one or more modules such as module 106, etc. that perform one or more of the following: automated expansion of program source code, automated refactoring of program source code and/or automated reduction of program source code, as described more fully herein. It will be appreciated that the one or more modules 106, etc. that perform automated expansion of program source code, automated refactoring of program source code and/or automated reduction of program source code can be loaded into memory 144 to cause one or more processors such as processor 142, etc. to perform the actions attributed to the one or more modules 106, etc. that perform automated expansion of program source code, automated refactoring of program source code and/or automated reduction of program source code. System 100 can include any combination of one or more of the following: an editor such as but not limited to editor 114, a display device such as display device 128, a compiler (not shown) and/or a parser such as but not limited to parser 116. Other components well known in the arts may also be included but are not here shown.

One or more modules such as module 106, etc. that perform automated expansion of program source code, automated refactoring of program source code and/or automated reduction of program source code can include any combination of one or more of: an automated expansion module such as automated expansion module 108, an automated refactoring module such as automated refactoring module 110 and an automated reduction module such as automated reduction module 112.

Automated expansion module 108 can receive program source code to be refactored such as original source code 118 from an editor such as editor 114 or from a parser such as parser 116. Automated expansion module 108 may receive directly or indirectly from user input 126, information that identifies one or more refactoring operations to be performed on the program source code. For example, an intended refactoring operation can be indicated by highlighting or otherwise selecting a portion of a program loaded into an editor and then indicating a refactoring operation to be applied to the selected text. The refactoring operation to be applied to the selected text can be indicated by, for example, right clicking on the selected text and selecting a menu option, or by any other means well known in the art. Automated expansion module 108 may receive information that identifies a universe of source code on which the one or more refactoring operations can be performed. Automated expansion module 108 can expand the program source code associated with the one or more refactoring operations to create expanded program source code such as expanded source code 120. Automated expansion module 108 can expand the program source code by any combination of one or more of: making references explicit, inserting typecasts and inserting sets of parentheses around expressions or elements of an expression so a parser can correctly parse the expression, replacing extension method invocations in instance syntax with static invocation syntax, or escaping identifiers. Automated expansion module 108 can send or provide the expanded source code 120 to an automated refactoring module such as refactoring module 110 and hide the expanded program source code from view in a program source code editor. Automated expansion module 108 can provide the expanded source code 120 to an editor to be displayed for manual refactoring.

Automated refactoring module 110 can receive the expanded source code 120 from automated expansion module 108. Automated refactoring module 110 can receive the manually expanded source code from editor 114. Automated refactoring module 110 can receive information that identifies one or more refactoring operations to be performed on the program source code. Automated refactoring module 110 may receive information that identifies a universe of source code on which the one or more refactoring operations are to be performed. Automated refactoring module 110 can transform the expanded program source code by performing the one or more identified refactoring operations on the expanded program source code. Automated refactoring module 110 can perform the one or more refactoring operations on the indicated universe of program source code to create refactored expanded program source code such as refactored expanded source code 122. Automated refactoring module 110 can send or provide the refactored expanded source code 122 to an automated reduction module such as automated reduction module 112 and can hide the refactored expanded source code 122 from view in a program source code editor. Automated refactoring module can provide the refactored expanded source code 122 to an editor to be displayed for manual reduction.

Automated reduction module 112 can receive manually refactored code for reduction from the editor. Automated reduction module 112 can receive the refactored expanded source code 122 from automated refactoring module 110. Automated reduction module 112 can receive information that identifies one or more expanded refactored expressions in refactored expanded source code 122. Automated reduction module 112 may receive information that identifies a universe of source code to be reduced. Automated reduction module 112 can reduce the manually refactored program source code received from the editor. Automated reduction module 112 can reduce the refactored expanded program source code 122. Automated reduction module 112 can reduce the refactored expanded source code 122 to remove portions of the refactored program source code after the program source code is refactored. Automated reduction module 112 can reduce the refactored source code received from the editor to remove portions of the refactored program source code after the program source code is refactored. In accordance with some aspects of the subject matter described herein, only the expansions made to the program source code are reduced. This may, for example, retain developer coding preferences in the original program source code. Automated reduction module 112 can send or provide the reduced refactored source code 124 to an editor for display and further editing or refactoring. Automated reduction module 112 can be used to identify redundant code. For example, type casts that can be removed without changing the meaning of the code can be indicated by, for example, displaying the code in a semi-transparent font.

One or more of the one or more modules such as module 106, etc. that perform automated expansion of program source code, automated refactoring of program source code and/or automated reduction of program source code may be attached to, incorporated within or associated with an editor such as editor 114. Editor 114 may be an interactive design time source code editor. Editor 114 by itself or in conjunction with a parser, may be capable of parsing any programming language(s) including C# (CSharp), VISUAL BASIC®, C, C++, JAVA®, Ruby, Perl, Python, Fortran, Cobol, JAVASCRIPT®, F# (FSharp), Scala or any other programming language now known or developed in the future. Editor 114 may receive program source code and display it as original source code 118 on display device 128. Editor 114 may receive refactoring directives identifying one or more refactoring operations to be applied to source code. Editor 114 may receive refactoring directives identifying a universe of program source code to which the one or more refactoring operations are to be applied. Editor 114 can be associated with a parser such as parser 116 that creates a parse tree from the program source code loaded into the editor.

One or more of the one or more modules such as module 106, etc. that perform automated expansion of program source code, automated refactoring of program source code and/or automated reduction of program source code may be attached to, incorporated within or be associated with a parser such as parser 116. Parser 116 can be a background parser, parallel parser or incremental parser. Parser 116 can be a pre-processor, or a plug-in or add-in or an extension to an IDE, parser, compiler or pre-processor. Parser 116 can create a parse tree as described more fully in in U.S. patent application Ser. No. 12/683,445 entitled "EFFICIENT IMMUTABLE SYNTAX REPRESENTATION WITH INCREMENTAL CHANGE" filed Jan. 7, 2010 which describes creation of a re-usable tree data structure comprising a first immutable private tree and a second public tree where the public tree can control access to the private tree. The combination of the private and public trees can enable both upward and downward references in the data structure to exist, and can enable immutable (read-only or unchangeable) and changeable characteristics to coexist in the same data structure. Parts of the data structure can be re-used in other tree data structures. The private tree can retain relative information which allows it to be reassembled and re-used. The public tree can retain consumer-specific information and enable tools to search and target particular sub-trees in the private tree. Construction of the public tree (except for the root node) can be deferred until a node in the public tree is requested. The public tree can be constructed on demand in response to a consumer request to access a node in the private tree.

The data structure described above can be used to present compiler-generated trees such as parse trees, syntax trees, semantic trees and bound trees in a way that allows bi-directional pointers, consumer-specific and relative position to be represented, is both immutable and yet allows for efficient creation and evolution of trees, creating new versions of a read-only tree of the data structure without recreating the whole tree. In accordance with aspects of the subject matter disclosed herein, a data structure comprises a private tree that is not directly accessible to the consumer or consumers and a public tree that is directly accessible to the consumer or consumers. The public tree provides indirect access to the private tree. The private tree has uni-directional pointers pointing from parent node to child node and can be re-used. The public tree may be a non-re-useable bi-directionally referencing tree or may be a re-useable uni-directional pointing tree. A tree element in the public tree can also point to a corresponding or equivalent tree element in the consumer-inaccessible private tree. That is, a node in the public tree may point to its parent node in the public tree and also may point to an equivalent private tree node. The node in the public tree may also have pointers to its child nodes in the public tree. The pointers to the child nodes in the public tree may be determined lazily (on-demand) when requested by the consumer. If the node in the public tree does not have pointers to its child nodes in the public tree, the public child nodes are created for each request and are not retained or re-used. Hence the data structure appears to the consumer or consumers to have bi-directional references but still maintains data integrity because of the hidden private tree.

The characteristics described above allow for efficient incremental updates of the data structure. Suppose a consumer such as module 106 wants to create a version of a tree that differs from an original tree (original program source code). Module 106 can create a data structure comprising a new public tree that represents the original program source code and a new inaccessible private tree that may share nodes with the previous private tree and that represents the expanded program source code. A root created for the new public tree can represent the tree representing the expanded program source code and can coexist with the root for the original tree with maximal sharing of existing nodes in the original tree.

FIGS. 1b-1i illustrate an example of the operation of system 100 on a sample of program source code. FIG. 1b illustrates an example of program source code 150 that is to be refactored. Line 1 151 of source code 150 indicates that the namespace "System" is being used. The namespace "System" is used here because namespace "System" includes the type "Action" that appears on line 6 156 and on line 7 157. Line 2 152 ("class C") defines a new class (i.e., the new class "C"). Two methods or functions are defined in program source code 150. The static function "Main( )" is defined on line 4 154 and the static function Foo is defined on line 10 160. Function "Main( )" is a function that runs the program. Foo is a generic function that receives an instance of T. Line 6 156 declares a variable "f" of type Action<string> which is set equal to function "Foo<string>" defined on line 10 160. Line 7 157 declares a variable g of type Action<string> which is set equal to null. Line 8 158 declares a new variable h which is set equal to f plus g. Line 8 158 "var h=f+g;" resolves to a known operator that combines these two Action<string> objects. The variable "f" on line 8 158 is a reference to the function Foo for a particular instance of Foo<T> where <T> is replaced by <string>.

Suppose the desired refactoring is to optimize the code by inlining the expression assigned to the temporary variable "f" at the reference to temporary variable "f" and removing the declaration of the temporary variable "f" Inlining can refer to a manual or automated optimization that replaces a segment of program code such as a function call site with the body of the callee. Inlining can also refer to a manual or automated optimization that replaces a variable name (here, the temporary variable "f") with the expression that is assigned to the variable (here, "Foo<string>" is the expression assigned to temporary variable "f").

An inlining optimization may improve use of time and space at runtime, at the possible cost of increasing the final size of the program (e.g., the size of the binary or executable file may increase). For example, typically when a function is invoked, control is transferred to the definition of the function by a branch or call instruction. When a function call is replaced by the body of the function, control passes directly to the code for the body of the function, without a branch or call instruction.

Inlining a function removes the cost of the function call and return instructions, and the cost of preceding or following code that may be injected into the function. Eliminating branches and keeping code that is executed close together in memory can improve instruction cache performance. After inlining other intraprocedural optimizations become possible on the inlined code. For example, a constant passed as an argument, can often be propagated to all instances of the matching parameter, or part of the function may be removed from a loop. Inlining can increase readability of the code. While a user such as a developer may manually inline a code segment through copy and paste, automated inlining is not as likely to create errors that arise because the user overlooks a (possibly modified) duplicated version of the original code while for example, refactoring to improve readability of the code.

FIG. 1c illustrates the expected result (i.e., source code 162) of refactoring the source code 150 of FIG. 1b. Line 6 156 has been eliminated and references to the temporary variable f have been replaced with the explicit value (Foo<string>) for the temporary variable f in line 7 163. Finally, a set of parentheses 163a has been placed around the explicit value "Foo<string>" in line 7 163.

The expected result is difficult to achieve when implementing the refactoring using traditional automated refactoring tools that do not expand the code because the expression assigned to the temporary variable "f" (e.g., the expression "Foo<string>") will not be parsed correctly by the parser because the expression assigned to the temporary variable "f" is not surrounded by parentheses.

In accordance with aspects of the subject matter disclosed herein, an automated expansion module of an automated refactoring tool makes the portion or portions of the program source code affected by the refactoring operation(s) explicit. For example, a reference to an alias can be replaced with whatever the alias represents. FIG. 1d illustrates the source code 150 of FIG. 1b which has been expanded to include explicit parentheses and full-qualified typecasts. In expanded source code 164 of FIG. 1d, the expression assigned to the temporary variable "f" on line 6 165 and the reference to the temporary variable "f" on line 8 166 are made explicit. The expression assigned to the temporary variable "f" and the reference to the temporary variable "f" are made explicit by expanding the program source code to include explicit parentheses and fully-qualified typecasts. In FIG. 1d line 6 165 corresponding to line 6 156 in FIG. 1b is expanded by identifying the expression "(Foo<string>)" explicitly as ((global::System.Action<global::System.String>)(Foo<string>)); thereby resolving the implicit alias (which uses line 1 151 "using System;" to resolve the Action type) to an exact value to which the alias resolves. That is, the type Action is identified as a typecast to a global type that resides in the namespace System.

Similarly, String is identified as a typecast to a global data type that resides in the namespace System. In FIG. 1d, the same resolution is made for variable f on line 8 166 of FIG. 1d. It will also be appreciated that another set of parentheses have been placed around Foo<string>, needed because of the explicit name resolution. That is Foo<string> of line 6 156 in FIG. 1b; was transformed into (Foo<string>) in line 6 165 of FIG. 1d and when the explicit name resolution was performed the expression was transformed into "((global::System.Action<global::System.String>)(Foo<string>))" by adding a second set of parenthesis around the whole expression.

FIG. 1e illustrates the refactored expanded source code 164 of FIG. 1d in which the expression assigned to the temporary variable "f" is inlined at the reference to the temporary variable "f" in line 8 166 of FIG. 1d. That is:

var h=((global::System.Action<global::System.
String>)(f))+g; line 8 166 of source code 164,
FIG. 1d becomes:

var h=((global::System.Action<global::System.
String>)(((global::System.Action<global::System.String>)(Foo<string>))))+g;

line 7 168 of program source code 167 of FIG. 1e. The declaration of the temporary variable "f" line 6 165 of source code 164, FIG. 1d is removed.

FIG. 1f illustrates the reduced refactored expanded program source code 167 of FIG. 1e. Reduced refactored program source code 170 has been reduced by analyzing typecasts and removing unnecessary parentheses. In FIG. 1e line 7 168 of reduced refactored program source code 167 is var h=((global::System.Action<global::System.
String>)(((global::System.Action<global::System.String>)(Foo<string>))))+g;

In FIG. 1f line 7 170 of program source code 169 is:

var h=((global::System.Action<global::System.
String>)(((global::System.Action<global::System.String>)Foo<string>)))+g;

wherein the set of parentheses around Foo<string> have been removed.

FIG. 1g illustrates further reduced refactored program source code 171 in which the redundant typecast is removed. In FIG. 1f line 7 170 is:

var h=((global::System.Action<global::System.
String>)(((global::System.Action<global::System.String>)Foo<string>)))+g;

In FIG. 1g line 7 172 is:

var h=((global::System.Action<global::System.
String>)((Foo<string>)))+g;

FIG. 1h illustrates the further reduced refactored program source code 173 in which two sets of unnecessary parentheses are removed. In FIG. 1g line 7 172 is:

var h=((global::System.Action<global::System.
String>)((Foo<string>)))+g;

In FIG. 1h line 7 174 is:

var h=((global::System.Action<global::System.
String>)Foo<string>)+g;

FIG. 1i illustrates the further reduced refactored program source code 175 in which the cast is determined to be redundant and is removed. In FIG. 1h line 7 174 is:

var h=((global::System.Action<global::System.
String>)Foo<string>)+g;

In FIG. 1i line 7 176 is:

var h=(Foo<string>)+g;

The reason the typecast is unneeded is because of the arithmetic expression ( )+g. The variable g is a known type so the compiler will be able to figure out the expression without the typecast. Finally, the parentheses surrounding Foo<string> are analyzed and determined to be necessary and are left in the reduced source code.

Figure 2:
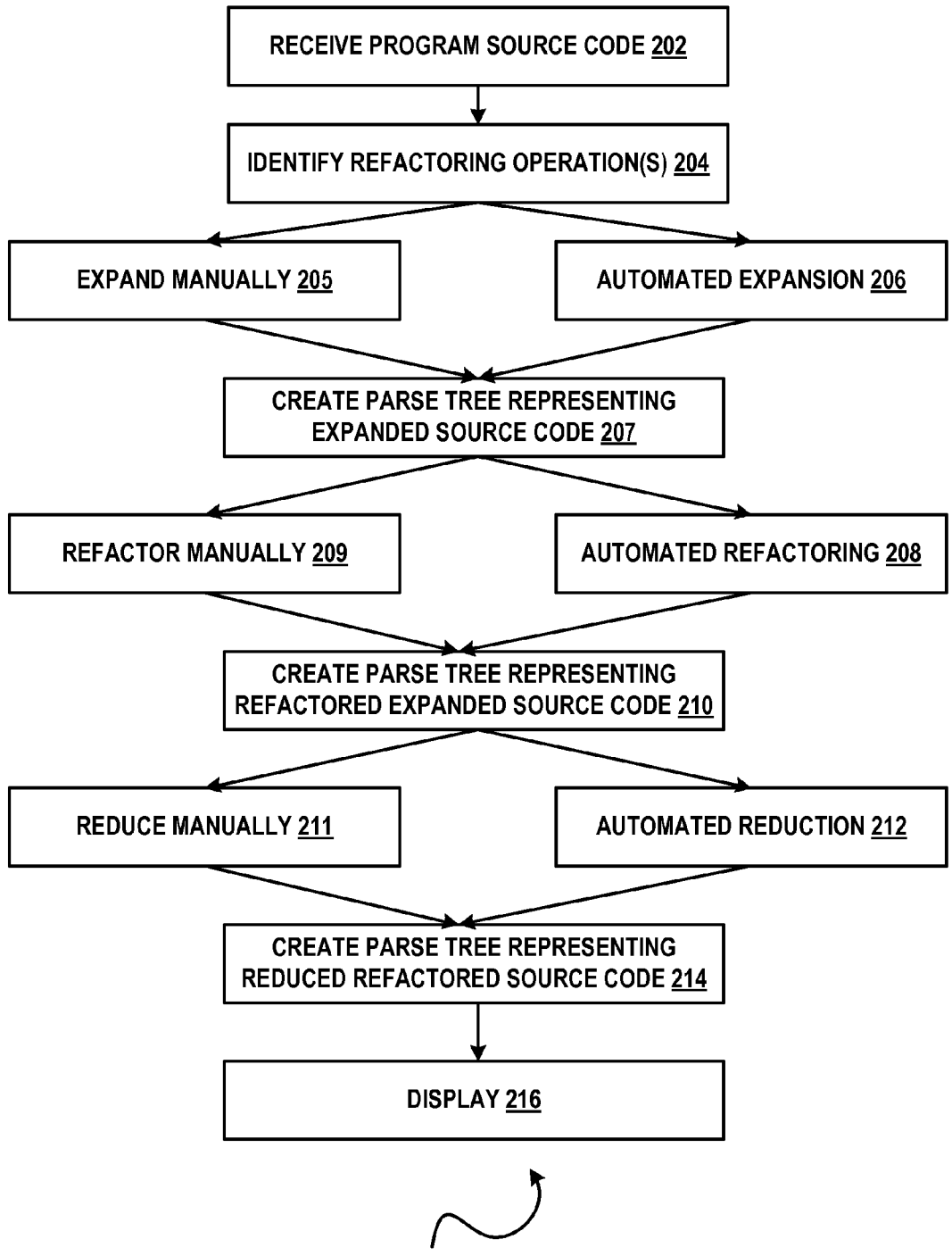
FIG. 2 illustrates an example of a method 200 that automatically refactors program source code in accordance with aspects of the subject matter disclosed herein.

FIG. 2 illustrates an example of a method 200 that can automatically expand program source code, refactor the expanded program source code and/or reduce the refactored expanded program source code in accordance with aspects of the subject matter disclosed herein. The method described in FIG. 2 can be practiced by a system such as but not limited to the one described with respect to FIG. 1a and for which an example was provided in FIGS. 1b through 1i. While method 200 describes a series of operations that are performed in a sequence, it is to be understood that method 200 is not limited by the order of the sequence. For instance, some operations may occur in a different order than that described. In addition, one operation may occur concurrently with another operation. In some instances, not all operations described are performed.

At operation 202 program source code can be received and loaded into an editor. The editor may be associated with a background parser that generates a parse tree from the program source code. At operation 204 refactoring directives can be received. An indication of one or more refactoring operations may be received. A universe of program source code on which the one or more refactoring operations can be applied can be identified. At operation 206 the portions of the program source code affected by the one or more refactoring operations can be sent to and received by an automated expansion module. The automated expansion module can expand the program source code as described more fully above. The automated expansion module can keep track of the expansions made to the program source code. Alternatively the program source code can be expanded manually at operation 205.

A parse tree representing the expanded program source code can be created at operation 207. At operation 208, the expanded program source code can be received by an automated refactoring module. The automated refactoring module can refactor the expanded parse tree representing program source code as described more fully above. Alternatively at 209 the expanded source code can be manually refactored.

At 210 a parse tree representing the refactored expanded code can be created. At 212 the parse tree representing the refactored expanded code can be sent to and can be received by the automated reduction module. The automated reduction module can reduce the refactored program source code as described more fully above. Alternatively, the parse tree representing the refactored code can be manually reduced at 211. At 214 the reduced refactored program source code can be sent to and received by an editor for editing or further refactoring. At 216 the reduced refactored program source code can be displayed on a display device.

Example of a Suitable Computing Environment

Figure 3:
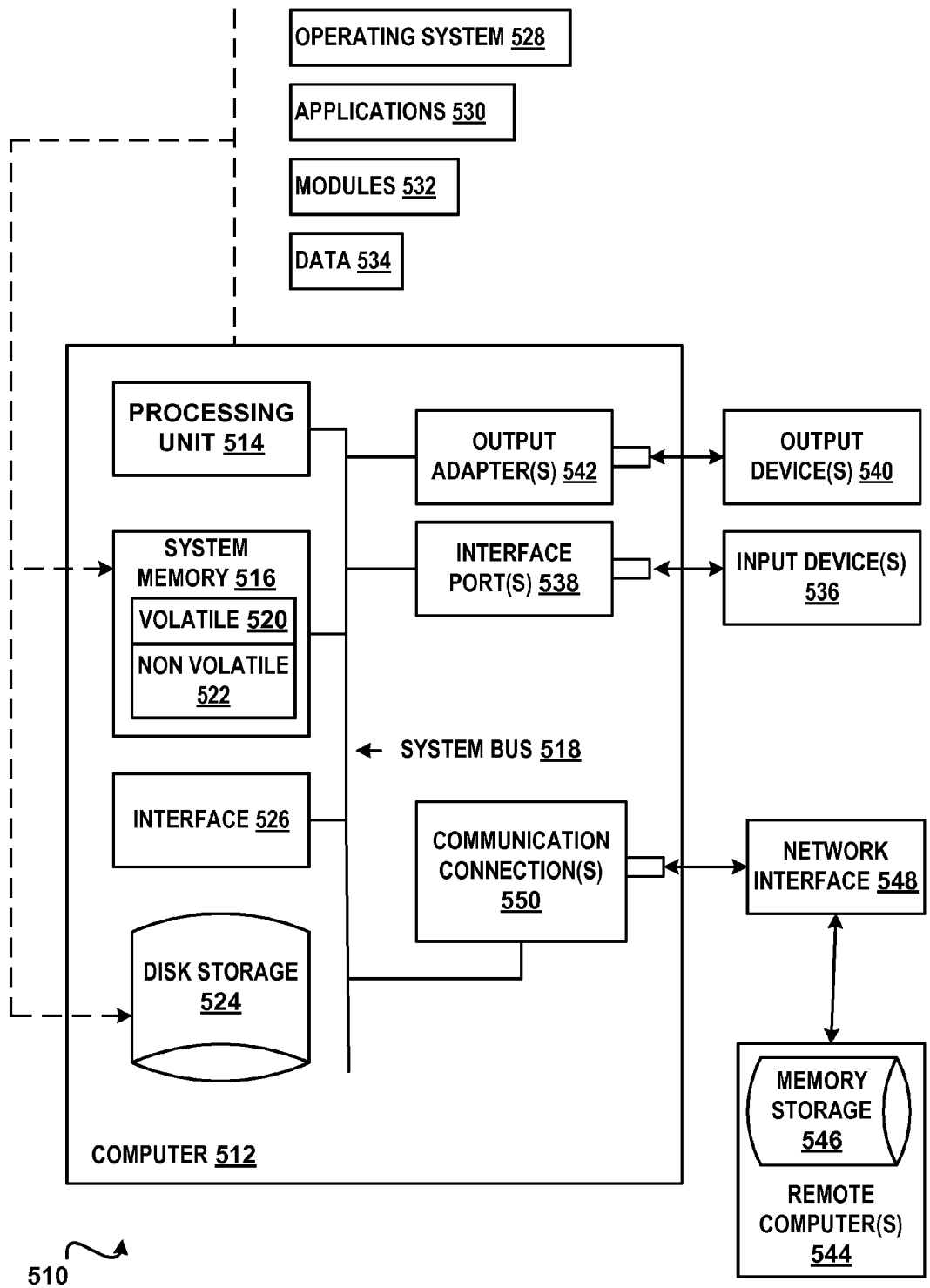
FIG. 3 is a block diagram of an example of a computing environment in accordance with aspects of the subject matter disclosed herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include at least one processing unit 514, a system memory 516, and a system bus 518. The at least one processing unit 514 can execute instructions that are stored in a memory such as but not limited to system memory 516. The processing unit 514 can be any of various available processors. For example, the processing unit 514 can be a graphics processing unit (GPU). The instructions can be instructions for implementing functionality carried out by one or more components or modules discussed above or instructions for implementing one or more of the methods described above. Dual microprocessors and other multiprocessor architectures also can be employed as the processing unit 514. The computer 512 may be used in a system that supports rendering graphics on a display screen. In another example, at least a portion of the computing device can be used in a system that comprises a graphical processing unit. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures. Computer 512 may include a data store accessible by the processing unit 514 by way of the system bus 518. The data store may include executable instructions, 3D models, materials, textures and so on for graphics rendering.

Computer 512 typically includes a variety of computer readable media such as volatile and nonvolatile media, removable and non-removable media. Computer readable media may be implemented in any method or technology for storage of information such as computer readable instructions, data structures, program modules or other data. Computer readable media include computer-readable storage media (also referred to as computer storage media) and communications media. Computer storage media includes physical (tangible) media, such as but not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices that can store the desired data and which can be accessed by computer 512. Communications media include media such as, but not limited to, communications signals, modulated carrier waves or any other intangible media which can be used to communicate the desired information and which can be accessed by computer 512.

It will be appreciated that FIG. 3 describes software that can act as an intermediary between users and computer resources. This software may include an operating system 528 which can be stored on disk storage 524, and which can allocate resources of the computer 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, voice recognition and gesture recognition systems and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection(s) 550. Network interface 548 encompasses communication networks such as local area networks (LANs) and wide area networks (WANs) but may also include other networks. Communication connection(s) 550 refers to the hardware/software employed to connect the network interface 548 to the bus 518. Communication connection(s) 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 4:
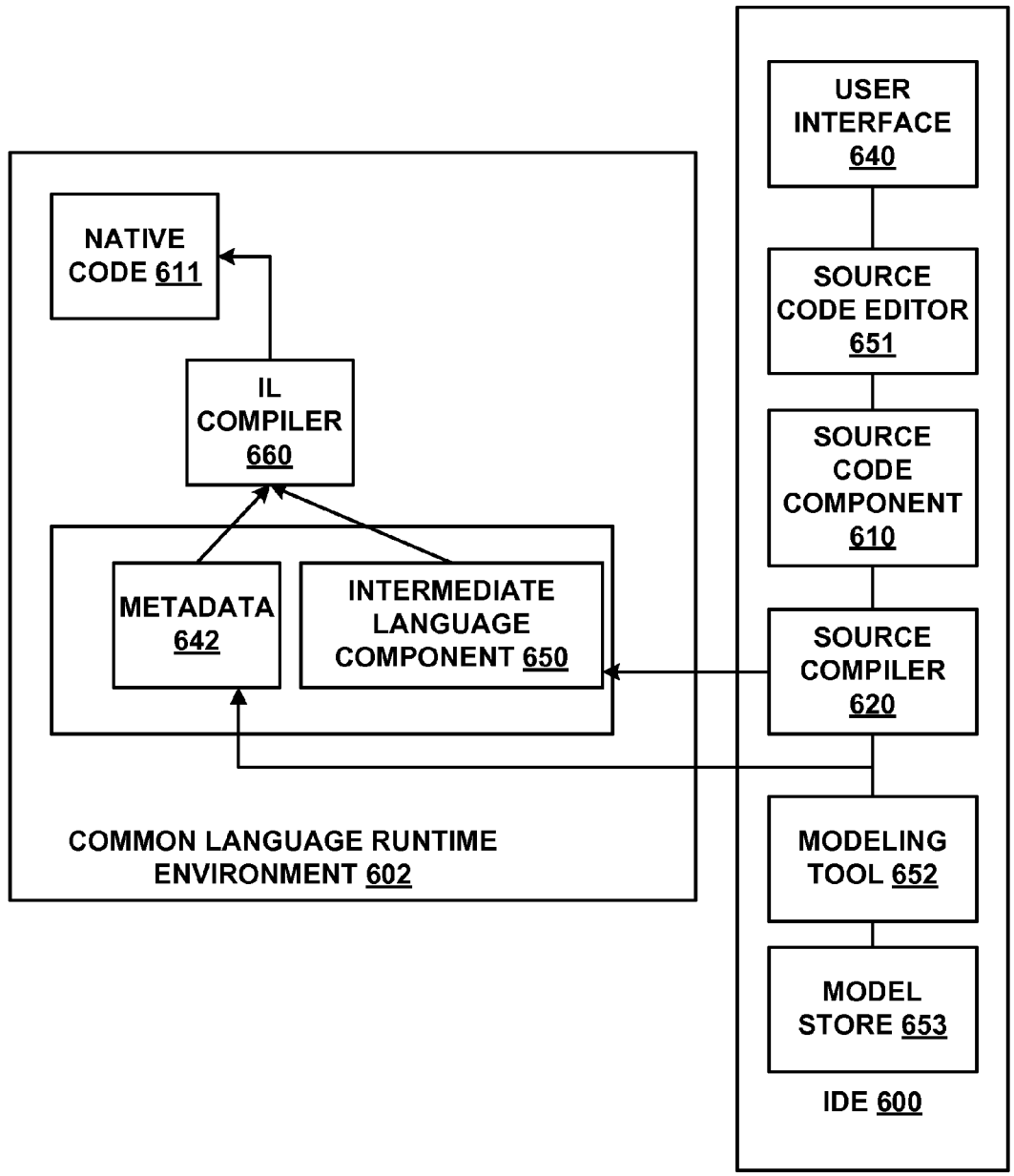
FIG. 4 is a block diagram of an example of an integrated development environment (IDE) in accordance with aspects of the subject matter disclosed herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., VISUAL BASIC®, Visual J#, C++. C#, J#, JAVASCRIPT®, APL, COBOL, Pascal, Eiffel, Haskell, ML, Oberon, Perl, Python, Scheme, Smalltalk and the like). The IDE 600 may provide a native code development environment or may provide a managed code development that runs on a virtual machine or may provide a combination thereof. The IDE 600 may provide a managed code development environment using the Microsoft. NET™ framework. An intermediate language component 650 may be created from the source code component 610 and the native code component 611 using a language specific source compiler 620 using a modeling tool 652 and model store 653 and the native code component 611 (e.g., machine executable instructions) is created from the intermediate language component 650 using the intermediate language compiler 660 (e.g. just-in-time (JIT) compiler), when the application is executed. That is, when an intermediate language (IL) application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable storage medium" shall be taken to exclude any mechanism that provides (i.e., stores and/or transmits) any form of propagated signals. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:
   at least one processor:
   a memory connected to the at least one processor: and
   a module that when loaded into the at least one processor causes the at least one processor to:
   receive at least one refactoring operation to be applied to program source code;
   expand at least one section of the program source code affected by the at least one refactoring operation to create expanded program source code;
   keep track of expansions made to the program source code to create the expanded program source code; and
   apply the at least one refactoring operation to the expanded program source code to create refactored expanded program source code.

2. The system of claim 1, further comprising:
   a module that when loaded into the at least one processor causes the at least one processor to:
   expand the at least one section of the program source code affected by the at least one refactoring operation to create expanded program source code by inserting typecasts into the program source code to create the expanded program source code, by replacing identifiers in the program source code with fully-qualified names to create the expanded program source code, or by inserting sets of parentheses into the program source code to create the expanded program source code.

3. The system of claim 1, wherein expand at least one section of the program source code affected by the at least one refactoring operation to create expanded program source code is applied manually.

4. The system of claim 1, further comprising:
   a module that when loaded into the at least one processor causes the at least one processor to:
   receive refactored expanded program source code;
   reduce expansions made to the program source code to create the expanded source code; and
   create reduced refactored expanded program source code by removing unnecessary program source code that was inserted as part of expanding the program source code.

5. The system of claim 1, further comprising:
   a module that when loaded into the at least one processor causes the at least one processor to:
   create reduced refactored program source code by removing program source code that was inserted as part of expanding the program source code.

6. The system of claim 3, further comprising:
   a module that when loaded into the at least one processor causes the at least one processor to:
   remove inserted typecasts, name qualifications, or sets of parentheses, inserted by an automated expansion programming tool while leaving program source code unaffected by the one or more refactoring operations unchanged.

7. The system of claim 1, further comprising:
a module that when loaded into the at least one processor causes the at least one processor to:
keep track of expansions made to program source code by annotating a node in a parse tree representing the program source code.

8. A method implemented on a computing device having at least one processor, the method comprising:
receiving refactored expanded program source code by the processor, the refactored expanded program source code comprising source code to which at least one refactoring operation has been applied, wherein the source code was expanded prior to refactoring, wherein the expansion performed at least one of: qualifying at least one identifier, inserting at least one typecast, or inserting at least one set of parentheses; and
reducing the received refactored expanded program source code by removing at least one of: at least one unnecessary typecast, at least one unnecessary identifier qualification or at least one unnecessary set of parentheses around an expression.

9. The method of claim 8, further comprising:
expanding at least one section of program source code affected by at least one refactoring operation to create expanded program source code by inserting at least one typecast into the program source code to create the expanded program source code, or by replacing at least one identifier in the program source code with a fully-qualified name to create the expanded program source code, or by inserting at least one set of parentheses into the program source code to create the expanded program source code.

10. The method of claim 9, further comprising:
keep tracking of expansions made to the program source code to create the expanded program source code.

11. The method of claim 9, further comprising:
automatically programmatically refactoring the expanded program source code.

12. The method of claim 9, further comprising:
keeping track of expansions made to the program source code by annotating nodes of a parse tree representing the expanded source code.

13. The method of claim 8, further comprising;
sending reduced refactored program source code to an editor.

14. A computer-readable storage medium, not including a signal per se, comprising computer-readable instructions which when executed cause at least one processor of a computing device to:
receive by an automated expansion module at least one refactoring operation to be applied to program source code;
expand at least one section of the program source code affected by the at least one refactoring operation to create expanded program source code prior to performing the at least one refactoring operation; and
keep track of expansions made to the program source code to create the expanded program source code; and
reduce the expanded program source code by removing at least one expansion of the expansions made to the expanded source code after the at least one refactoring operation has been applied to the expanded source code.

15. The computer-readable storage medium of claim 14, comprising further computer-readable instructions that when execute cause the at least one processor to:
expand the at least one section of the program source code affected by the at least one refactoring operation to create expanded program source code by inserting at least one typecast into the program source code to create the expanded program source code, by replacing at least one identifier in the program source code with a fully-qualified name to create the expanded program source code, or by inserting at least one set of parentheses into the program source code to create the expanded program source code.

16. The computer-readable storage medium of claim 14, comprising further computer-readable instructions which when executed cause the at least one processor to:
receive the expanded program source code by an automated refactoring module; and
refactor the expanded program source code to create refactored expanded program source code.

17. The computer-readable storage medium of claim 14, comprising further computer-readable instructions which when executed cause the at least one processor to:
receive by an automated reduction module refactored expanded program source code;
reduce expansions made to the program source code to create the expanded source code; and
create reduced refactored expanded program source code by removing unnecessary program source code that was inserted as part expanding the program source code.

18. The computer-readable storage medium of claim 14, comprising further computer-readable instructions which when executed cause the at least one processor to:
remove inserted typecasts, name qualifications, or sets of parentheses, inserted by the automated expansion programming tool while leaving program source code unaffected by the one or more refactoring operations unchanged.

19. The computer-readable storage medium of claim 14, comprising further computer-readable instructions which when executed cause the at least one processor to:
receive program source code written in C#.

20. The computer-readable storage medium of claim 14, comprising further computer-readable instructions which when executed cause the at least one processor to:
receive program source code written in a programming language that supports refactoring.

* * * * *